United States Patent [19]
Saksena

[11] Patent Number: 6,055,572
[45] Date of Patent: Apr. 25, 2000

[54] SYSTEM AND METHOD FOR CREATING PATHFILES FOR USE TO PREDICT PATTERNS OF WEB SURFACES

[75] Inventor: Gagan Saksena, Mountain View, Calif.

[73] Assignee: Netscape Communications Corporation, Mountain View, Calif.

[21] Appl. No.: 09/009,715

[22] Filed: Jan. 20, 1998

[51] Int. Cl.[7] ........................................ G06F 13/00
[52] U.S. Cl. ..................... 709/224; 709/219; 709/223
[58] Field of Search ................................ 709/201, 202, 709/203, 217, 218, 219, 223, 224, 234, 300; 707/10, 100, 104

[56] References Cited

U.S. PATENT DOCUMENTS

| | | | |
|---|---|---|---|
| 5,530,849 | 6/1996 | Hanushevsky et al. | 707/1 |
| 5,835,087 | 11/1998 | Herz et al. | 345/327 |
| 5,870,559 | 2/1999 | Leshem et al. | 709/224 |
| 5,895,471 | 4/1999 | King et al. | 707/104 |

OTHER PUBLICATIONS

PeakSoft Corporation, PeakJet Features, 1997.
Ascent Solutions Inc., Blaze! Web Performance Pack, xSpeed technology: Here's how it works, 1997.
Padmanabhan et al., "Using Predictive Prefetching to Improve World Wide Web Latency", Jul./1996, ACM, vol. 26, No. 3, pp. 22–36.
Wang et al., "Prefetching in World Wide Web", 1996, IEEE.

*Primary Examiner*—Viet D. Vu
*Attorney, Agent, or Firm*—Michael A. Glenn; Kirk D. Wong

[57] ABSTRACT

A prefetching and control system for a computer network environment. The user configures the client's prefetch parameters which are: enabling/disabling prefetching, prefetch threshold value, and the maximum number of documents to prefetch. A prefetch value or weight is contained in the Hypertext Markup Language (HTML) page or prefetch file, called a pathfile, for each link. The HTML page contains the prefetch values for each of its links, while pathfile contains the weights for every link on the HTML page associated with the Universal Resource Locator (URL). The client compares the prefetch or weight values of each link with its threshold value to decide if the link should be prefetched and placed in the local cache as long as the maximum number of documents to prefetch is not exceeded. Pathfiles reside on the server and are created by the server or web administrator/author. The server automatically creates the pathfiles from its log files which are filtered to retain all of the valid document requests and average paths are derived from the filtered results. Weights are assigned to each path in the URL by the server and inserted into the pathfile along with the associated paths. If no log files exist on the server, then the web administrator/author may manually enter in the weights for each path.

16 Claims, 7 Drawing Sheets

SYSTEM AND METHOD FOR CREATING PATHFILES FOR USE TO PREDICT PATTERNS OF WEB SURFACES

BACKGROUND OF THE INVENTION

TECHNICAL FIELD

The invention relates to the performance enhancement of network browsers in a computer environment. More particularly, the invention relates to the intelligent prefetching of documents across a computer network, efficiently using the free bandwidth and enhancing perceived performance on the client.

DESCRIPTION OF THE PRIOR ART

The popularity of the Internet has exploded in recent years. Typical users are based in their homes with Internet access through modems. Unfortunately, modem access speeds are relatively slow, causing Internet browsers to respond sluggishly. Slow servers and networks also contribute to this latency. The latency on the client is measured by the time lag that is perceived by the user. It is the time period from the moment that the user first clicks on a document link to the point in time when the document actually appears on his screen.

When the user clicks on a particular link, the Internet browser pulls a web document off of a web site. The browser does this by instantiating a connection with the web site server and pulls the document down from the server.

One approach to improving the perceived performance of the browser is by prefetching documents. Prefetching is the retrieval of documents from the web before the user makes an explicit request for them. The links are pulled down from the server onto the client and placed in a cache on the client. When the user actually clicks on a link, it comes from the cache rather than the network. The perceived performance is increased because the user thinks that the document is coming off the network when it actually is coming from his cache.

Many Internet browsers and add-on programs currently perform a "blind" prefetch, whereupon the browser pulls down all of the document links on a web page before the user has actually clicked on them. For example, in a very simple model of blind prefetching, the client pulls down page A from a server, parses the document links on that page and pulls each of them into the local cache. When the user clicks on a link to page B, it is loaded from the prefetched copy in the cache.

One of the problems with the blind prefetch approach is that it is very inefficient. The client must make multiple requests for all of the document links on a page. The server must respond to each request by sending the appropriate document, thereby forcing the server to send many more documents than are needed. This scenario is repeated for every client communicating with the server. The result is high network traffic and overloading of the server. Further, the client has no control over what is being pulled down from the server in this approach; it blindly makes the requests.

It would be advantageous to provide a prefetching and control system that improves the user-perceived network performance by allowing the client to efficiently decide what documents to prefetch, thereby reducing the demand on the server and network. It would further be advantageous to provide a prefetching and control system that enables the server to designate to the client what document links are important or the most common on a page.

SUMMARY OF THE INVENTION

The invention provides a prefetching and control system. The invention uses an easily configured prefetching system that allows a client to control the amount of documents that are prefetched from a server in a computer network environment. In addition, the invention uses a server-based control system that enables the server to pre-define the priority of each document link on a web page and notify a client of those priorities.

In a preferred embodiment of the invention, the user configures the client's prefetch parameters which are: enabling/disabling prefetching, prefetch threshold value, and the maximum number of documents to prefetch. A prefetch value or weight is contained in the Hypertext Markup Language (HTML) page or prefetch file, called a pathfile, for each link. The HTML page contains the prefetch values for each of its links, while pathfile contains the weights for every link on the HTML page associated with the Universal Resource Locator (URL). The client compares the prefetch or weight values of each link with its threshold value to decide if the link should be prefetched. If the value of the link is greater than the threshold value, then the link is prefetched and placed in the local cache as long as the maximum number of documents to prefetch is not exceeded. The client efficiently uses its free bandwidth by prefetching the documents that are most likely to be read by the user, thereby improving the user-perceived network performance and reducing the demand on the server and network.

Pathfiles reside on the server and are created by the server or web administrator/author. The server automatically creates the pathfiles from its log files. The log files are filtered to retain all of the valid document requests and average paths are derived from the filtered results. Weights are assigned to each path in the URL by the server and inserted into the pathfile along with the associated paths. If no log files exist on the server, then the web administrator/author may manually enter in the weights for each path. Pathfiles give the server the power to control client access to its resources.

Other aspects and advantages of the invention will become apparent from the following detailed description in combination with the accompanying drawings, illustrating, by way of example, the principles of the invention.

DETAILED DESCRIPTION OF THE INVENTION

As shown in the drawings for purposes of illustration, the invention is embodied in a prefetch and control system for Internet client/server applications. A system according to the invention provides a configurable document prefetch in both the client and server in a computer network, thereby enhancing the user-perceived network performance. Many existing Internet browsers and add-on programs perform a "blind" document prefetch and provide little or no client or server control.

Figure 1:
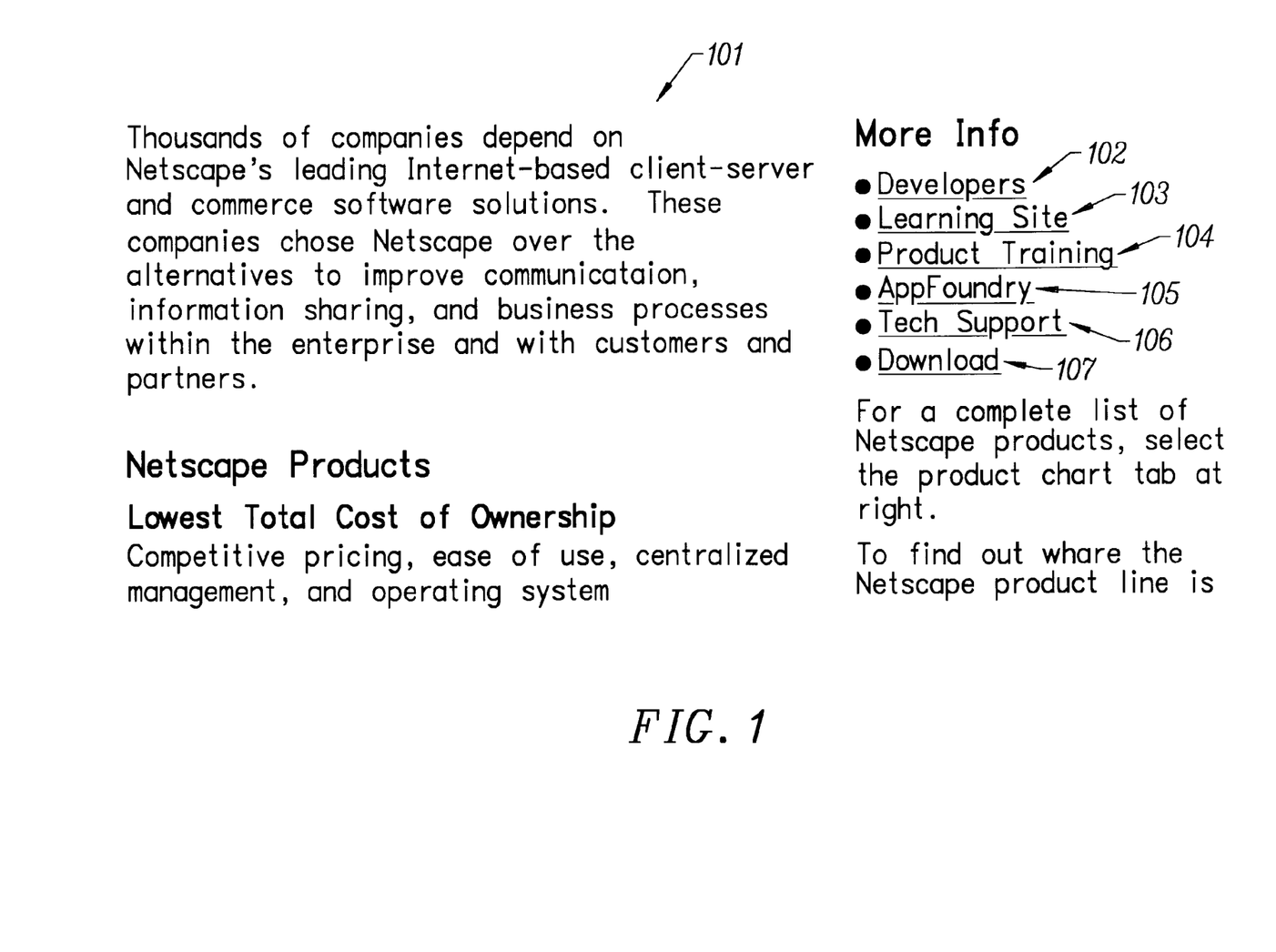
FIG. 1 is a schematic diagram of a web page containing document links according to the invention.

Referring to FIG. 1, a browser retrieves a page 101. During a blind prefetch, the browser requests the documents for all of the links on the page 101. Here, the browser requests the documents for the Developers 102, Learning Site 103, Product Training 104, AppFoundry 105, Tech Support 106, and Download 107 links from the server and places them in the local cache.

A prefetch and control system according to the invention includes a user-configurable prefetch limit on the client, combined with a prefetch file, called a pathfile, and a Hypertext Markup Language (HTML) web page document. The pathfile and HTML page are used by the client to decide what documents to prefetch. The server or web administrator/author creates the pathfile which the client retrieves from the server. The HTML page is created by the web author. This combination of configurability and pathfile/HTML page control efficiently uses the free network bandwidth on the client and lessens the load on the server, while additionally allowing the server to limit client access to its resources.

A user typically requests a page from a website at least once during normal browser use. Documents are prefetched while the user reads the page. The free bandwidth of the client is taken advantage of by prefetching to the local cache. A separate request for each prefetched document must be made by the client to the server. The invention allows the user to configure the client to prefetch a limited number of documents, which reduces the cache memory demand and lessens the load on the server through a smaller number of document requests. The user also configures the threshold value, which is the value that the client uses to decide which documents to prefetch.

Figure 2:
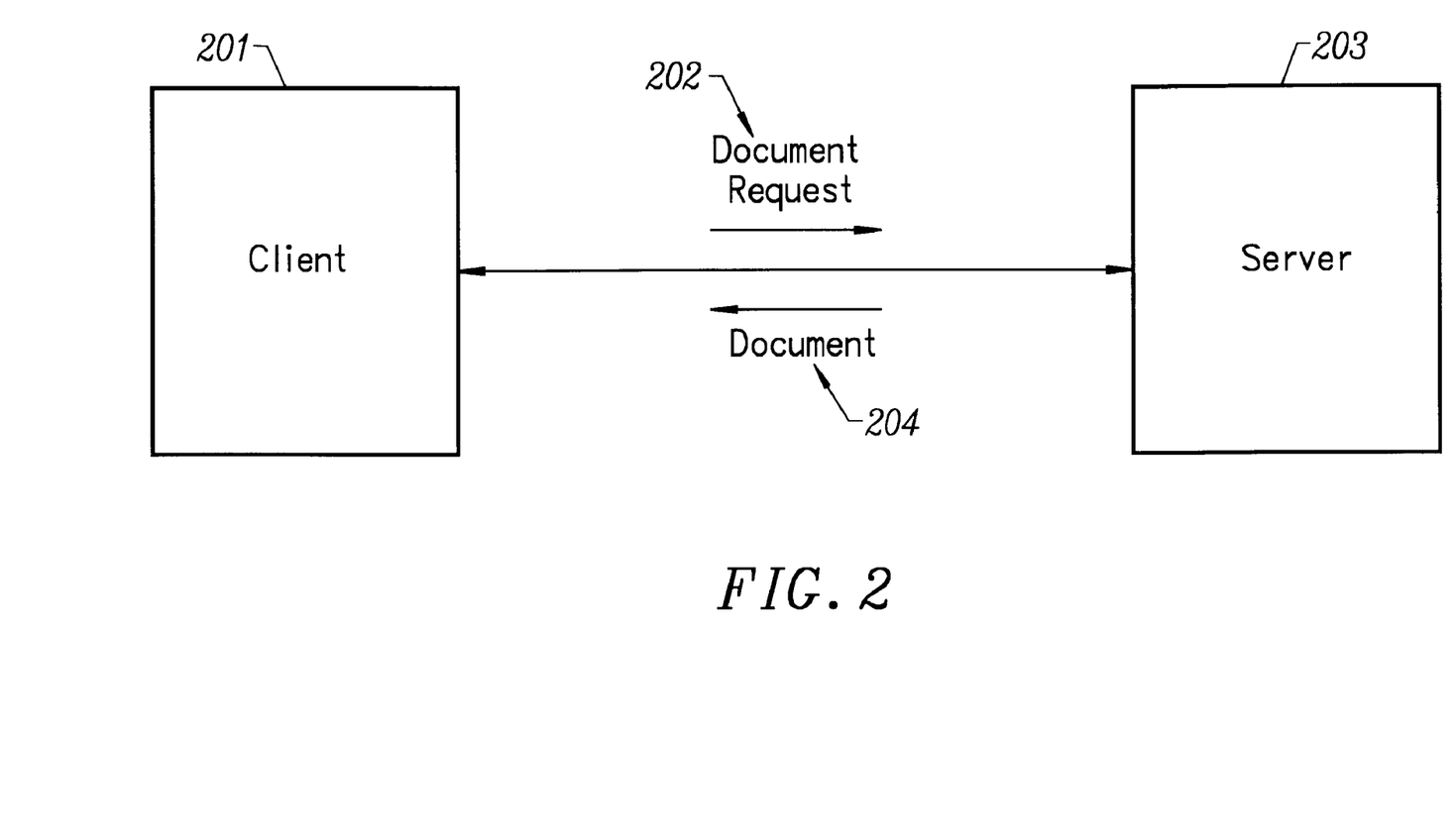
FIG. 2 is a block schematic diagram of a document request/reply sequence of an Internet based client/server configuration according to the invention.
Figure 3:
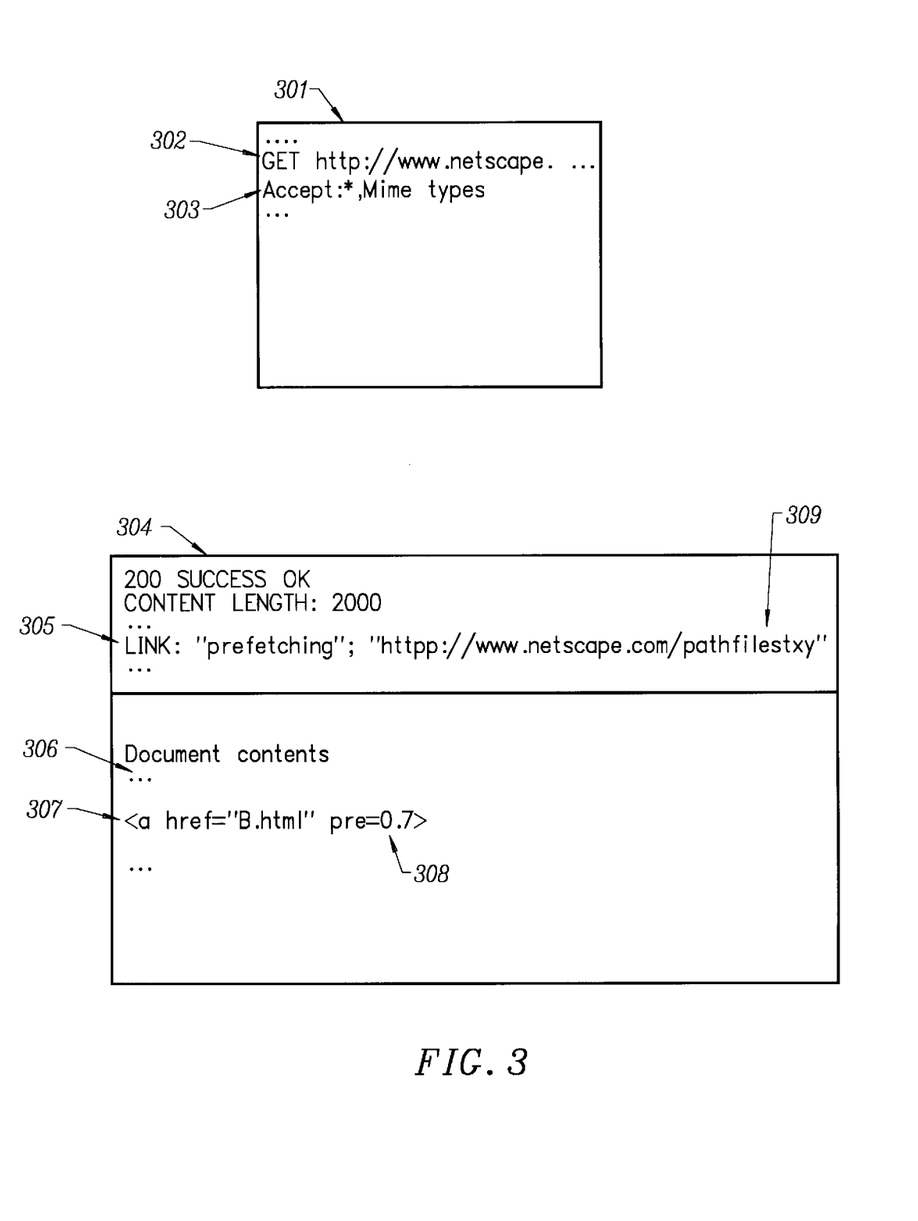
FIG. 3 is a block schematic diagram of the contents of a document request and a document packet according to the invention.

With respect to FIGS. 2 and 3, the client 201 sends a document request 202 to the server 203. The document request packet 301 contains a document request 302 (the GET command) along with information, such as the client's capabilities, i.e. what the client is capable of handling (for example, what MIME types 303). The server 203 responds with the requested document 204. The HTML document 306 has an Hypertext Transfer Protocol (HTTP) header 304 attached. In this example, within the header 304 is an extension to the LINK tag 305 that tells the client 201 that if the client 201 is prefetch enabled, then it can find the pathfile for this Universal Resource Locator (URL) at "http://www.netscape.com/pathfilestxy" 309. The client 201 requests that document 309 from the server 203 if it has been enabled for prefetching and is unable to parse the prefetch values 308 in the HTML document 306.

The client 201 uses the prefetch values 308 in the HTML document 306 or pathfile 309 to decide which links on the page are the most likely to be accessed by a typical user. It prefetches the number of documents that it has been configured for from the server 203 according to the threshold value that the user configured on the client 201. Documents are prefetched that have prefetch values above the user-configured threshold value. The HTML document 306 contains prefetch values 308 for each document link contained on that page, while the pathfile 309 contains the prefetch values for every link in the URL.

A prefetching client first attempts to parse the contents and extract the prefetch information from the ANCHOR and the LINK (described later in this text) tags. The ANCHOR tag appears in the HTML document.

The following is an example of a specification for the ANCHOR tag:
Extension to HTML:
The client prefetching involves the following enhancement to the anchor <A> tag:

| Subtag | Description |
| --- | --- |
| NAME | Named link end |
| HREF | URL tor link resource. |
| REL | Relationship forward link type. |
| REV | Reverse link. |
| TITLE | Advisory title string |
| PRE | Prefetch value. |

The ANCHOR tag remains backward compatible. It defaults to no prefetching. The PRE subtag of the ANCHOR tag holds a prefetch value which has the following properties:

Typically ranging from 0.0 to 1.0. This value indicates the relevance in retrieving the link before the user asks for it. The higher this value, the more likely it is to be retrieved.

These values will be normalized for a page.

The PRE value is ignored for non-relevant protocols like telnet:, mailto:, news:, etc.

After normalizing, two links of similar values will be pulled in the order they appear in the document.

Zero value indicates that this link is never prefetched. Even if the user's threshold value is set to zero.

Although the invention is described as having prefetch values ranging from 0.0 to 1.0, one skilled in the art can readily appreciate that there are many other ways to achieve this operation using other enumerated values, for example: low, medium, and high.

The client has a very simple design because it interacts and uses the functionality of already existing modules. It reads the preferences for the user and, if prefetching is turned on, it builds a list of documents to prefetch from the current page based on the ANCHOR tag's PRE value. The client skips those links which have a PRE value less than the one specified by the user. It then removes those links which are already in the cache or currently being downloaded (possibly in a GETLIST). The client then proceeds to download these documents on a lower priority. The speed of the network connection is a useful factor in determining what and how much to prefetch. Links that have been prefetched may be displayed in a different color to convey to the user which documents that have been prefetched.

As mentioned above, the user configures the following parameters on the client:

Enable/disable prefetching.

Prefetch threshold—ranges from 0.0 to 1.0. Good performance vs. Low disk use.

Maximum number of documents to prefetch.

Pathfiles

Pathfiles are used to predict the access patterns of web surfers. The web administrator/author of the document suggests certain paths that a user may follow from a given page. Pathfiles are created by web administrators/authors to improve the perceived access time of their web sites. The client makes a best guess using the pathfile to prefetch the most likely next choice or path of the user. Pathfiles are also used by the server to tell the client that it does not support prefetching. The following is an example of a specification for the format of a pathfile:

If for some reason the client does not or can not (as in the case of a proxy) parse the content of a document for prefetch information, it should then use the mechanism described below to access the pathfile for a given document.

Mechanism

To assist a prefetching client, the server creates pathfiles for each resident URL. When the client sends a GET request for the document, the server replies with an additional LINK header referencing "prefetching" and an HREF pointing to the location of the pathfile.

If prefetching is enabled on the client side, and the client does not already have the pathfile for this document, it requests the corresponding pathfile from the server. The client then parses the pathfile to assert that a valid entry of the current document is available. It then locates this document and reads the links pointed to by it. Based on the weights allocated in the pathfile, a client may decide to pull all, some, or none of the links in that list. These are the "prefetched" documents. They are held in a prefetch cache until the user of that client makes an explicit request for them or they expire.

Syntax

The semantics of the pathfile are as follows:
Naming

The pathfiles may be named anything that may be considered an acceptable filename. This approach ensures consistency, the ability to be used on most of the common operating systems, and requires no server configuration.
Location The location of the pathfile is completely flexible. A server may decide to keep all of the pathfiles related to its site in a particular directory. However the pathfile must not span servers. A pathfile relating to documents on a server must be kept on the same server to enable the client to generate fully qualified and valid URLs for the documents listed in the pathfile.
Content The pathfile contains the list of documents recommended by the author for prefetching. The first entry in the pathfile is the "Realm" which indicates the relative path for the use with documents within a Realm. Realm has the following construct:

Realm:<CR|CRLF|LF>/[<relative path name>]
    <CR|CRLF|LF>

A pathfile may have more than one Realm. If the Realm entry does not tally with the document being analyzed, the client should check other Realms listed in a pathfile. If none of the Realm entries match the document, the client must abort prefetching on the current document. The other entries organized in records consist of a filename, followed by a list of documents that may be prefetched after this file is fetched by the client. These records are separated by one or more blank lines.

Each record has the following construct:
filename:<CR|CRLF|LF><prefetch document URL>
    [<space><weight>]<CR|CRLF|LF>[<prefetch document URL>[<space><weight>]<CR|CRLF|LF>]
    <CR|CRLF|LF>

In this example, the filename is the name of the document that the client wants to analyze. Each record is terminated by an empty line. The client ignores empty lists.

If no weights are assigned, then all of the links in the list have equal weights. Weights typically range from 0.0 to 1.0. This value indicates the relevance in retrieving the link before the user asks for it. The higher this value, the more likely it is to be retrieved. Weights will be normalized for a page.

Although the invention is described as having weight values ranging from 0.0 to 1.0, one skilled in the art can readily appreciate that there are many other ways to achieve this operation using other enumerated values, for example: low, medium, and high.
Comments:

Comments are added to a pathfile using the # syntax. Any line with the first non-blank character as a "#" is treated as a comment line and is not used for processing.

EXAMPLES

The following is a simple example of a pathfile:
Pathfile for http://dummy.server.com/
Generated manually by Gagan Saksena on Aug. 1st. '97
Other comments here.
Realm has the relative path from the server name
Realm:
/
The index.html file has links to several files.
It lists here all the relevant ones. Note that there
may be other links/files not mentioned here.
index.html:
/whatsnew.html
/help.html
/contents.html
/chap1/first.html
whatsnew.html:
/contents.html 0.7
/help.html 0.3
Note implicit values—here 0.5
contents.html:
/index.html
/chap1/first.html
Note a completely different file that may not even be
linked by any of the existing ones but has
links back to them.
secret.html:
/index.html
/pics/family.html The following is another example of a pathfile kept in a different directory:
Pathfile for http://gagan/
Generated manually by Gagan Saksena on Aug. 1st. '97
Other comments here.
Realm:
/chap1
index.html:
/index.html 0.2
/contents.html 0.2
first.html 0.6
first.html:
second.html 0.9
/contents.html 0.1 second.html:
first.html
/chap2/first.html

The following pseudo-code illustrates a typical prefetching client.

```
if (prefetching.enabled)
{
    //Construct the corresponding pathfile URL from
thisURL
    String pathfileLocation =
extractPathfileLocation From Headers(thisURL);
    //If the constructed pathfileLocation is not in cache
    if (!cache.inCache(pathfileLocation))
    {
        //Download and add to cache
        pathfile = fetch(pathfileLocation);
        cache.add(pathfileLocation, pathfile);
    }
    //Parse the pathfile
    PathfileParser parser = new Pathfileparser(pathfile);
    //If valid
    if (parser.contains((thisURL)))
    {
        //Construct the list to be prefetched for thisURL
        ListToPrefetch list = parser.list(thisURL,
prefetchThreshold);
        //Retrieve all of them
        while (link=list.getNext())
        {
            //Add to cache
            cache.add(link, fetch(link));
        }
    }
}
```

Figure 4:
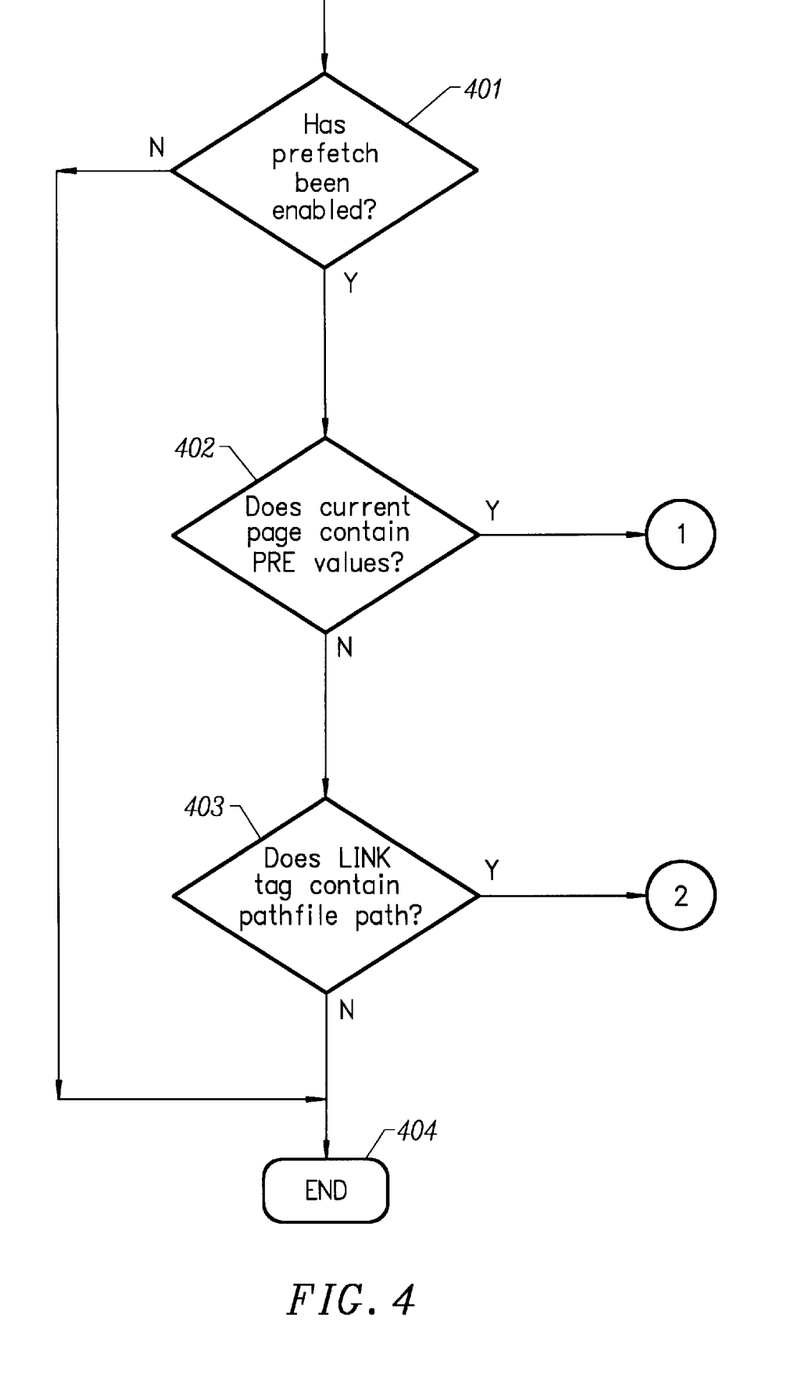
FIG. 4 is a block schematic diagram of a client prefetch sequence according to the invention.
Figure 5:
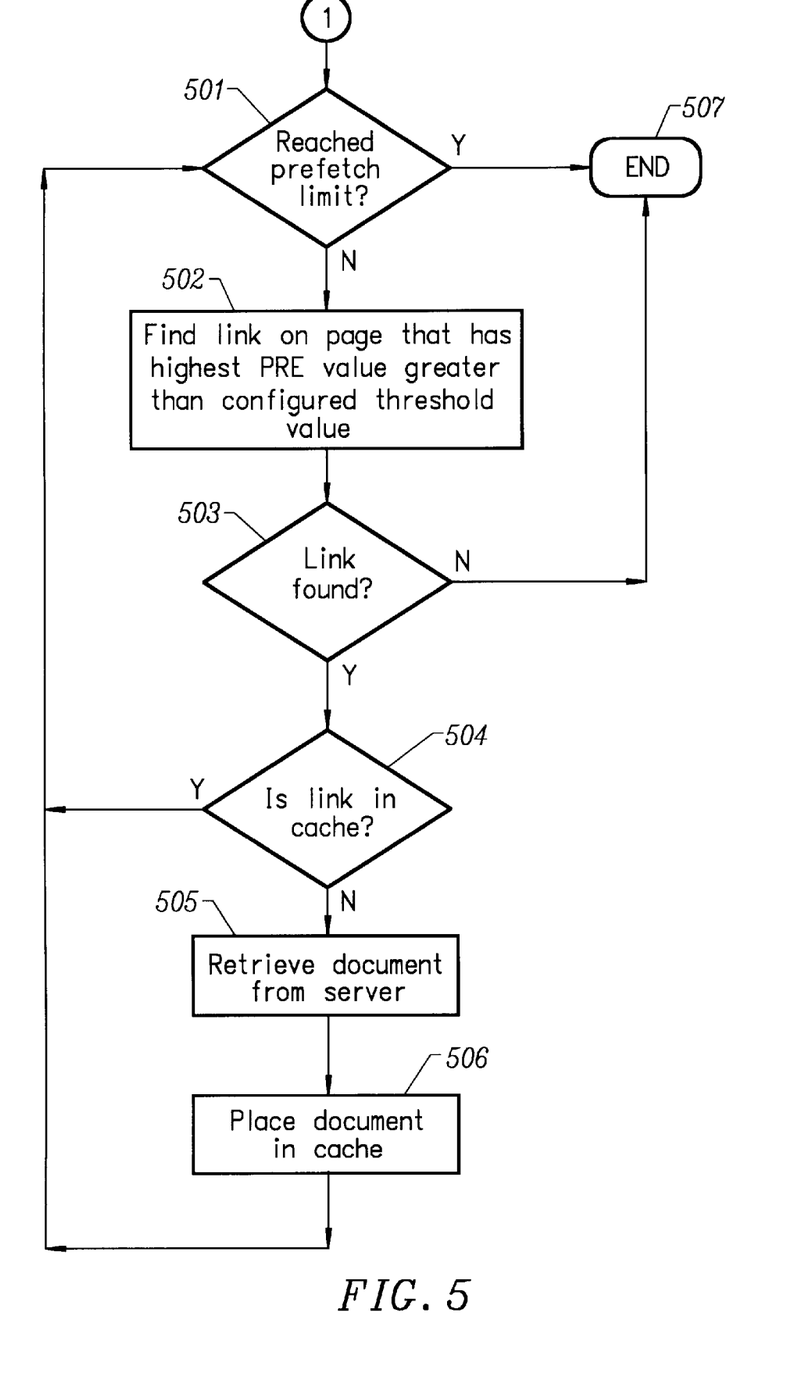
FIG. 5 is a block schematic diagram of a client prefetch sequence using an Hypertext Markup Language (HTML) document according to the invention.
Figure 6:
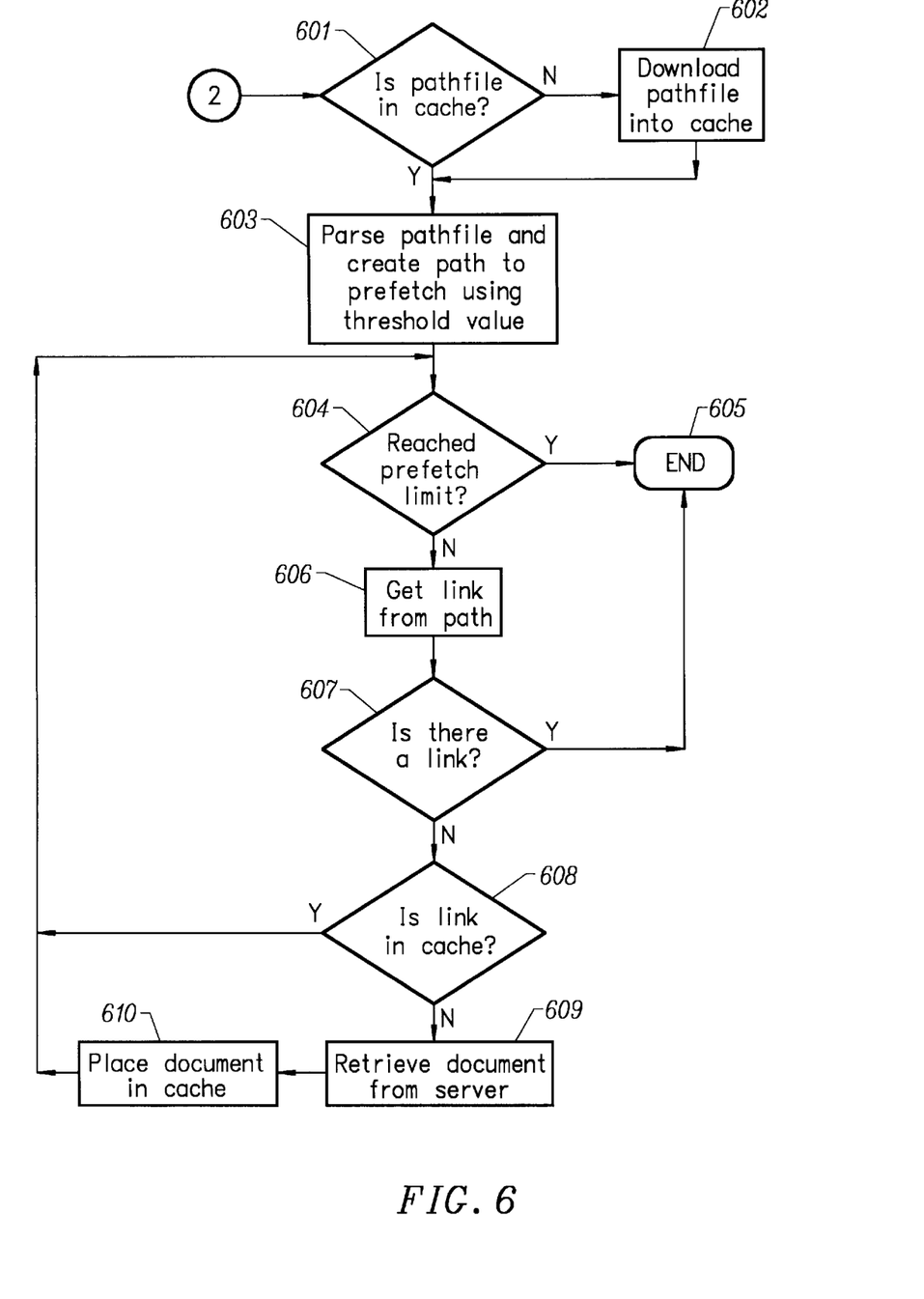
FIG. 6 is a block schematic diagram of a client prefetch sequence using a pathfile according to the invention.

The user configures the client's prefetch characteristics at any time. The prefetch characteristics include: enable/disable prefetching, prefetch threshold value, and document prefetch limit. Referring to FIGS. 4, 5, and 6, during normal operation, the client checks if the user has configured it for prefetching 401. If it is not, then the prefetch process is skipped. If prefetch has been enabled, then the client looks at the current page for prefetch values 402.

If there are prefetch values in the page, then the client enters a prefetch loop and checks if the user configured prefetch limit has been reached 501. If the limit has been reached, the client ends the prefetch sequence 507. Otherwise, the client searches through the document for the link with the highest PRE value that is greater than the threshold value and has not been previously checked 502. If such a link is not found 503, then the prefetch sequence is ended 507. If a link is found 503, then the client checks if the link is already in the cache 504. If so, then the next iteration of the loop is performed 501. If the link is not in the cache, then the client retrieves the document from the server 505 and places the document in the cache 506. The loop then continues 501.

If the client is unable to parse the document for prefetch values, then it checks for a pathfile path in the LINK tag 403. If a path exists, the client checks if the pathfile is already in the cache 601. If it is not, then the client will get the pathfile from the server 602. The client parses the pathfile and creates the path that has the highest prefetch value above the threshold value 603. If the document prefetch limit has been reached 604, the prefetch process ends 605. Otherwise, the next link in the path is selected 606. If the link does not exist 607, then it is the path has ended and the prefetch process ends 605. If there is a link, then the link is checked to see if it is already in the cache 606. If so, then the next iteration of the loop is performed 604. If the link is not in the cache, then the client retrieves the document from the server 609 and places the document in the cache 610. The loop then continues 604.

If there is no pathfile path in the LINK tag, then the prefetch sequence ends 404.

Generating pathfiles:

Pathfiles reside on the server. In addition to being created manually by the web administrator/author, pathfiles are created automatically by the server using log files. Servers generate log files daily. Log files are created because system administrators want to keep track of what is happening in the server in case of a problem. These log files contain information such as the time a client connects to the server, the client's Internetwork Processor (IP) address, and what file was accessed.

Figure 7:
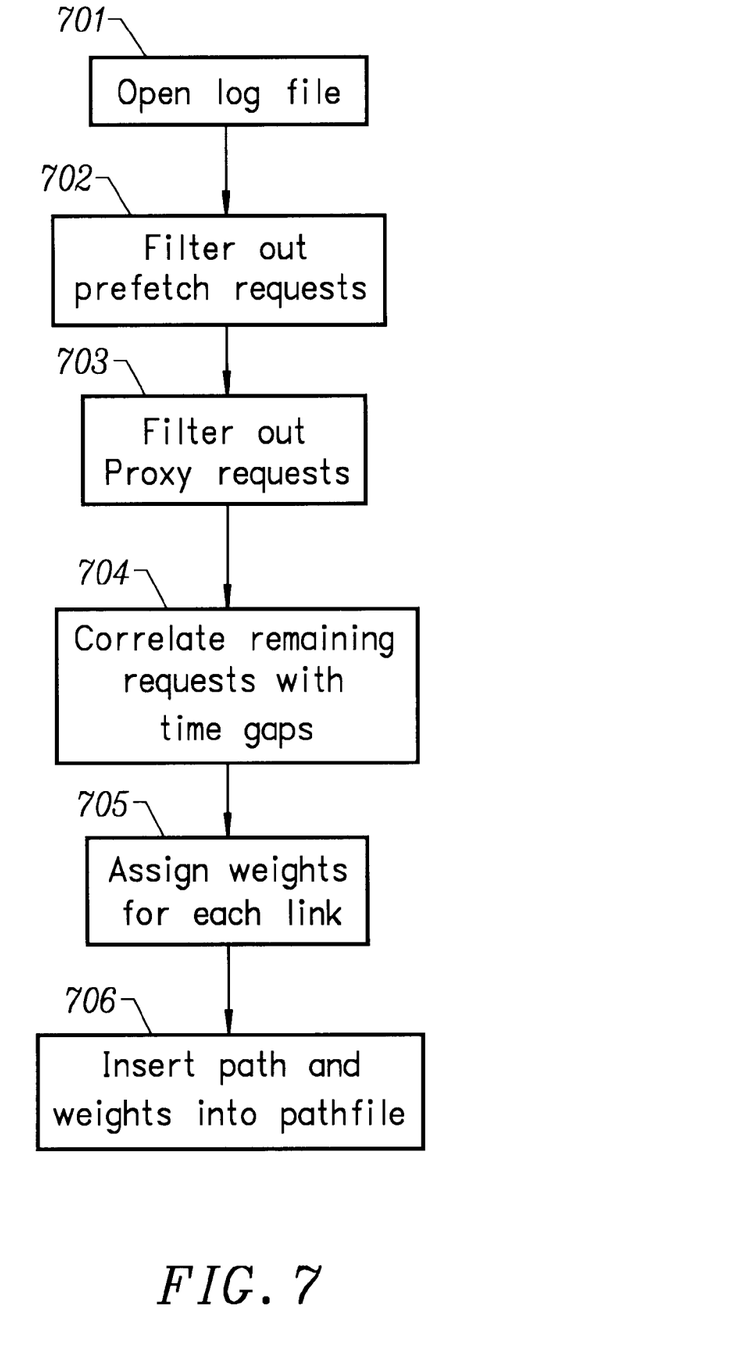
FIG. 7 is a block schematic diagram of a server pathfile creation sequence according to the invention.

Referring to FIG. 7, the server begins the pathfile creation process by opening the log file 701. The server keeps any normal GET requests and filters out all PREFETCH requests from the log file 702 which do not count as a normal fetch.

Next, proxy requests are filtered out 703 because whenever a client makes a request through a proxy server, what gets reflected in the server logs is the proxy, not the individual client. False correlations on pages resulting from, e.g. random accesses, browser reloads, are also filtered out of the log file. This is done by correlating the time gaps between logical requests 704. For example, if the time between 2 requests is greater than 10 minutes, then there is no relationship. If the gap is less than or equal to 10 minutes, then the path sequence is valid. Weights are then assigned to each link 705. Finally, each path with its associated weights are placed in the pathfile 706. The generated pathfile is the aggregate or sum of all of the average paths that were found of clients traversing the web.

If there are no log files available, then the web author may assign the weights.

In another preferred embodiment, the client tells the server that it is prefetch enabled and the server can decide whether it sends the pathfile path to the client. The server sends a multi-part message which includes the pathfile.

Further, prefetching is also predictive through user or website patterns. The following are examples of predictive prefetching:

Predictive prefetching based on mouse position. The client gives greater weight to the links that are closer to the user's mouse position on the page.

Predictive prefetching based on keyword indices. Users have a tendency to visit pages that have a common theme. The client queries each link on the page for keywords and follows a keyword pattern, e.g. sport, for document prefetching, giving higher weight to the links with the appropriate keyword matches.

Sequential patterns. Sequential patterns occur when the user traverses a list of links connected by ANCHOR tags. For example, when the pages represent a book where the user reads each page in succession and in order. The next logical page is given higher weight than the back link or home link.

Hub and spoke patterns. Hub and Spoke patterns occur when there is a main page that is the central hub for all of the links, for example, the user returns to the main page each time a link on the page is visited so he can follow other links on the main page. In this case, the prefetch would be weighted toward all of the links on the main page.

Advantages:

The server controls how much access is provided to the clients for prefetching.

The server can switch off or control the amount of access a particular client has, thereby allowing the server to keep a tab on its performance and not become flooded by several extra document requests.

refetch is controlled on both the client and server side (the client through the prefetch threshold level).

Although the invention is described as being applied to Internet browsers, one skilled in the art can readily appreciate that the invention has many other applications.

Although the invention is described herein with reference to the preferred embodiment, one skilled in the art will readily appreciate that other applications may be substituted for those set forth herein without departing from the spirit and scope of the present invention. Accordingly, the invention should only be limited by the Claims included below.

I claim:

1. A process for generating pathfiles in a computer network environment, comprising the step of:

creating a pathfile from the server log files;

wherein said pathfile is a prefetch file that contains paths within the HTML page associated with the Universal Resource Locator (URL) and their associated prefetch values; and wherein said prefetch values determine the relative weight of each link in said document.

2. The process of claim 1, said creating step further comprising the step of:

filtering out prefetch requests from said log file.

3. The process of claim 1, said creating step further comprising the step of:

filtering out proxy requests from said log file.

4. The process of claim 1, said creating step further comprising the steps of:

correlating the time gaps between logical document requests in said log file; and filtering out false correlations from said log file.

5. The process of claim 1, said creating step further comprising the step of:

assigning weights to each link within said URL.

6. The process of claim 1, said creating step further comprising the step of:

inserting said paths, links, and weights into said pathfile.

7. The process of claim 1, wherein said weights are assigned by the user.

8. The process of claim 1, further comprising the step of:

notifying the client of the location of said pathfile.

9. An apparatus for generating pathfiles in a computer network environment, comprising:

a module for creating a pathfile from the server log files;

wherein said pathfile is a prefetch file that contains paths within a Universal Resource Locator (URL) and their associated prefetch values; and wherein said prefetch values determine the relative weight of each link in said document.

10. The apparatus of claim 9, said creating module further comprising:

a module for filtering out prefetch requests from said log file.

11. The apparatus of claim 9, said creating module further comprising:

a module for filtering out proxy requests from said log file.

12. The apparatus of claim 9, said creating module further comprising:

a module for correlating the time gaps between logical document requests in said log file; and a module for filtering out false correlations from said log file.

13. The apparatus of claim 9, said creating module further comprising:

a module for assigning weights to each link within said URL.

14. The apparatus of claim 9, said creating module further comprising:

a module for inserting said paths, links, and weights into said pathfile.

15. The apparatus of claim 9, wherein said weights are assigned by the user.

16. The apparatus of claim 9, further comprising:

a module for notifying the client of the location of said pathfile.

* * * * *